United States Patent
Wan et al.

(10) Patent No.: US 12,451,128 B2
(45) Date of Patent: Oct. 21, 2025

(54) VOICE RECOGNITION METHOD AND RELATED PRODUCT

(71) Applicant: IFLYTEK CO., LTD., Anhui (CN)

(72) Inventors: Genshun Wan, Anhui (CN); Jianqing Gao, Anhui (CN); Zhiguo Wang, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 763 days.

(21) Appl. No.: 17/780,776

(22) PCT Filed: Dec. 14, 2020

(86) PCT No.: PCT/CN2020/136126
§ 371 (c)(1),
(2) Date: May 27, 2022

(87) PCT Pub. No.: WO2021/129439
PCT Pub. Date: Jul. 1, 2021

(65) Prior Publication Data
US 2023/0035947 A1    Feb. 2, 2023

(30) Foreign Application Priority Data

Dec. 28, 2019 (CN) .......................... 201911389673.X (51) Int. Cl.
*G10L 15/183* (2013.01)
*G06F 40/247* (2020.01)
(Continued)

(52) U.S. Cl.
CPC .......... *G10L 15/183* (2013.01); *G06F 40/247* (2020.01); *G06F 40/289* (2020.01); *G10L 15/04* (2013.01); *G10L 15/22* (2013.01)

(58) Field of Classification Search
CPC ....... G10L 15/183; G10L 15/04; G10L 15/22; G10L 15/063; G10L 15/18;
(Continued)

(56) References Cited

U.S. PATENT DOCUMENTS

| 8,447,608 B1 | 5/2013 | Chang et al. |
| 2012/0143605 A1 | 6/2012 | Thorsen et al. |

(Continued)

FOREIGN PATENT DOCUMENTS

| CN | 103838756 A | 6/2014 |
| CN | 104464733 A | 3/2015 |

(Continued)

OTHER PUBLICATIONS

Japanese Office Action issued in 2022-531437 mailed May 30, 2023, 7 pages.

(Continued)

*Primary Examiner* — Thierry L Pham
(74) *Attorney, Agent, or Firm* — Zhong Law, LLC (57) ABSTRACT

A speech recognition method and related products are provided. The method includes acquiring text contents and text-associated time information transmitted by a plurality of terminals in a preset scenario and determining a shared text for the preset scenario based on the text contents and the text-associated time information, obtaining a customized language model for the preset scenario based on the shared text, and performing speech recognition for the preset scenario with the customized language model. The method provides improved speech recognition for the preset scenario due to the correlation between the customized language model and the preset scenario.

18 Claims, 4 Drawing Sheets

Perform word segmentation and classification on the shared text to obtain a keyword, and update a hot word list based on the keyword to obtain a new hot word list — S201

Perform speech recognition with the customized language model and the new hot word list — S202

(51) Int. Cl.
*G06F 40/289* (2020.01)
*G10L 15/04* (2013.01)
*G10L 15/22* (2006.01)

(58) Field of Classification Search
CPC ............. G10L 2015/0631; G10L 15/26; G06F 40/247; G06F 40/289; G06F 40/20
USPC .......................................................... 704/235
See application file for complete search history.

(56) References Cited

U.S. PATENT DOCUMENTS

| | | | |
|---|---|---|---|
| 2013/0346077 A1* | 12/2013 | Mengibar | G10L 15/197 |
| | | | 704/235 |
| 2015/0278191 A1 | 10/2015 | Levit et al. | |
| 2017/0125013 A1 | 5/2017 | Yan | |
| 2018/0173494 A1 | 6/2018 | Choi et al. | |
| 2019/0251716 A1 | 8/2019 | Nelson | |
| 2021/0065704 A1 | 3/2021 | Kim | |

FOREIGN PATENT DOCUMENTS

| | | | | |
|---|---|---|---|---|
| CN | 105045778 A | | 11/2015 | |
| CN | 105448292 A | | 3/2016 | |
| CN | 105654945 A | | 6/2016 | |
| CN | 105719649 A | | 6/2016 | |
| CN | 106328147 A | | 1/2017 | |
| CN | 107644641 A | | 1/2018 | |
| CN | 108984529 A | | 12/2018 | |
| CN | 109272995 A | | 1/2019 | |
| CN | 110415705 A | * 11/2019 | ........... G10L 15/063 |
| CN | 110534094 A | | 12/2019 | |
| CN | 110544477 A | | 12/2019 | |
| CN | 111161739 A | | 5/2020 | |
| CN | 112037792 A | | 12/2020 | |
| CN | 112562659 A | | 3/2021 | |
| JP | 2004233541 A | | 8/2004 | |
| JP | 201148405 A | | 3/2011 | |
| JP | 2013029652 A | | 2/2013 | |
| KR | 20180069660 A | | 6/2018 | |
| KR | 20190121721 A | | 10/2019 | |

OTHER PUBLICATIONS

Liu et al., "Scene Text Recognition with CNN Classifier and WFST-Based Word Labeling," ICPR, 2016, pp. 1-6.
Liu et al., "Hierarchically Browse and Annotation System for News Video," China Academic Journal Electronic Publishing House, vol. 35, No. 1, 2009, pp. 1-3.
Chinese First Office Action issued in 201911389673.X mailed Mar. 22, 2022, 11 pages.
International Search Report and Written Opinion issued in PCT/CN2020/136126 mailed Mar. 8, 2021, 15 pages.
European Search report received for PCT Patent Application No. PCT/CN2020136126, mailed on Dec. 18, 2023.

* cited by examiner

VOICE RECOGNITION METHOD AND RELATED PRODUCT

This application is the national phase of International Patent Application No. PCT/CN2020/136126, titled "VOICE RECOGNITION METHOD AND RELATED PRODUCT", filed on Dec. 14, 2020, which claims priority to Chinese Patent Application No. 201911389673.X, titled "VOICE RECOGNITION METHOD AND RELATED PRODUCT", filed on Dec. 28, 2019, both of which are incorporated herein by reference in their entireties.

FIELD

The present disclosure relates to the field of speech recognition technology, and in particular to a speech recognition method and related products.

BACKGROUND

Speech recognition technology enables a machine to convert a speech signal into a text or a command through a recognition process and an understanding process.

In the conventional technology, before on-site speech recognition is performed in a scenario of a meeting, a speech, an interview or a lecture, it is required to acquire text materials, keywords, and the like for the scenario in advance to update a speech recognition model. Then speech recognition is performed with the updated speech recognition model, improving performance of field recognition in the scenario. However, with the above solution, it is required to acquire materials for the scenario in advance and human intervention is required, resulting in a limited usage scenario. In addition, when a sudden or temporary theme change occurs in the usage scenario, the original speech recognition model cannot optimize a recognition effect, resulting in low speech recognition accuracy and lowered user experience.

SUMMARY

A speech recognition method and related products are provided according to the embodiments of the present disclosure to improve speech recognition accuracy.

According to a first aspect of the embodiments of the present disclosure, a speech recognition method is provided. The method includes:
  acquiring text contents and text-associated time information transmitted by multiple terminals in a preset scenario and determining a shared text for the preset scenario based on the text contents and the text-associated time information; and
  obtaining a customized language model for the preset scenario based on the shared text, and performing speech recognition for the preset scenario with the customized language model.

In an implementation, obtaining the customized language model for the preset scenario based on the shared text, and performing speech recognition for the preset scenario with the customized language model includes:
  performing word segmentation and classification on the shared text to obtain one or more keywords, and updating a hot word list based on the one or more keywords to obtain a new hot word list; and
  performing speech recognition with the customized language model and the new hot word list.

In an implementation, before performing speech recognition for the preset scenario with the customized language model, the method further includes:
  performing word segmentation and classification on the shared text to obtain one or more keywords, and updating a hot word list for the preset scenario based on the one or more keywords to obtain a new hot word list.

In an implementation, performing speech recognition for the preset scenario with the customized language model includes:
  performing speech recognition for the preset scenario with the customized language model and the new hot word list.

In an implementation, the new hot word list takes effect when the new hot word list is generated.

In an implementation, determining the shared text for the preset scenario based on the text content and the text-associated time information includes:
  acquiring and recognizing a speech in the preset scenario to obtain a speech recognition result, where the speech recognition result includes a sentence text and sentence-associated time information; and
  comparing the text-associated time information with the sentence-associated time information, and determine a text content corresponding to text-associated time information matching the sentence-associated time information as the shared text.

In an implementation, the method further includes determining the speech recognition result as the shared text.

In an implementation, performing word segmentation and classification on the shared text to obtain the one or more keywords, and updating a hot word list for the preset scenario based on the one or more keywords to obtain a new hot word list includes:
  performing word segmentation and classification on the shared text to obtain a phrase set or a sentence set; and
  determining the one or more keywords based on word frequencies of phrases and a word frequency threshold, where the word frequency of a phrase represents the number of occurrences of the phrase in the phrase set or the sentence set.

In an implementation, determining the one or more keywords based on word frequencies of the phrases and the word frequency threshold includes:
  acquiring the word frequency of each phrase in the phrase set;
  determining a phrase having a word frequency greater than or equal to the word frequency threshold and transmitted by different terminals as one of the one or more keywords; and
  selecting another one of the one or more keywords from phrases having word frequencies less than the word frequency threshold with a TF-IDF algorithm.

In an implementation, before determining the one or more keywords based on word frequencies of phrases and the word frequency threshold, the method further includes:
  filtering the phrase set based on the hot word list.

In an implementation, performing word segmentation and classification on the shared text to obtain the one or more keywords, and updating the hot word list based on the one or more keywords to obtain the new hot word list further includes:
  determining homonym phrases in the one or more keywords or between the one or more keywords and the words in the hot word list;
  determining a sentence text including a phrase among the homonym phrases and replacing the phrase in the sentence text with a homonym of the phrase among the homonym phrases to obtain a sentence text subjected to phrase replacement; and determining, based on language model scores of sentence texts subjected to phrase replacement, a homonym phrase in a sentence text having a highest language model score as a new word to be added to the hot word list.

In an implementation, before obtaining the customized language model for the preset scenario based on the shared text and performing speech recognition for the preset scenario with the customized language model, the method further includes:

segmenting the speech recognition result to obtain a segmentation time point of a paragraph; and obtaining, after the segmentation time point, the customized language model for the preset scenario based on the shared text, and performing speech recognition for the preset scenario with the customized language model.

In an implementation, obtaining, after the segmentation time point, the customized language model for the preset scenario based on the shared text includes:

determining text similarities between the text contents and the speech recognition result; and filtering out, based on the text similarities and a text similarity threshold, a text content corresponding to text similarity less than the similarity threshold.

In an implementation, the multiple terminals include a first terminal and a second terminal. After the segmentation time point, the method further includes:

acquiring text similarities between text contents of the first terminal and the second terminal as first text similarities;

determining the number of first text similarities corresponding to the first terminal that are greater than a first preset similarity threshold;

acquiring a text similarity between the text content transmitted by the first terminal and the speech recognition result transmitted by the first terminal as a second text similarity; and filtering the shared text transmitted by the first terminal based on the number and the second text similarity.

In an implementation, obtaining the customized language model for the preset scenario based on the shared text includes:

acquiring an initial language model based on a shared text in a paragraph set, where the paragraph set is obtained after recognition of a current speech paragraph is finished; and probability interpolation is performed on the initial language model and a preset language model to obtain the customized language model.

In an implementation, the text content is generated by a user on the terminal and is related to the preset scenario. The text content includes at least one of a note made by the user based on the preset scenario, a mark made by the user on an electronic material related to the preset scenario, or a picture including text information taken by the user using an intelligent terminal.

According to a second aspect of the embodiments of the present disclosure, a speech recognition apparatus is provided. The apparatus includes an acquisition unit and a recognition unit.

The acquisition unit is configured to acquire text contents and text-associated time information transmitted by multiple terminals in a preset scenario and determine a shared text for the preset scenario based on the text contents and the text-associated time information.

The recognition unit is configured to obtain a customized language model for the preset scenario based on the shared text, and perform speech recognition for the preset scenario with the customized language model.

According to a third aspect of the embodiments of the present disclosure, a computer storage medium is provided. The computer storage medium stores a computer program. The computer program includes program instructions that, when being executed by a processor, implement all or part of the method according to the first aspect.

According to a fourth aspect of the embodiments of the present disclosure, a computer program product is provided. The computer program product includes a non-transitory computer-readable storage medium storing a computer program. The computer program is executable to cause a computer to implement part or all of steps of the method according to the first aspect. The computer program product may be a software installation package.

In the embodiments of the present disclosure, the text content and the text-associated time information transmitted by the multiple terminals in the preset scenario are acquired. The shared text for the preset scenario is determined based on the text content and the text-associated time information. The customized language model for the preset scenario is obtained based on the shared text. Speech recognition for the preset scenario is performed with the customized language model. Therefore, with the technical solution according to the embodiment of the present disclosure, the terminals in the preset scenario acquire the text content and the text-associated time information for the preset scenario to determine the shared text of the preset scenario, and thus the customized language model is obtained based on the shared text. The customized language model is highly correlated with the preset scenario, so that performing the speech recognition for the preset scenario with the customized language model effectively improves the accuracy of the speech recognition.

BRIEF DESCRIPTION OF THE DRAWINGS

In order to more clearly describe the technical solutions in the embodiments of the present disclosure, drawings to be used in the description of the embodiments of the present disclosure are briefly described hereinafter. It is apparent that the drawings described below show merely some embodiments of the present disclosure, and those skilled in the art may obtain other drawings according to the provided drawings without any creative effort.

DETAILED DESCRIPTION OF EMBODIMENTS

The technical solutions of the embodiments of the present disclosure are described clearly and completely below in conjunction with the drawings of the embodiments of the present disclosure.

It should be noted that in the specification, the claims and the drawings of the present disclosure, terms such as "first" and "second" are used for distinguishing different objects from each other rather than describing a certain order. In addition, terms of "include", "comprise" or any other variants are intended to be non-exclusive. For example, a process, a method, a system, a product or a device including a series of steps or units includes not only the enumerated steps or units, but also steps or units that are not enumerated, or also include other steps or units inherent in the process, the method, the product or the device.

The "embodiment" mentioned in the present disclosure means that specific features, structures or characteristics described in conjunction with the embodiment may be included in at least one embodiment of the present disclosure. The different appearances of this phrase in the specification do not necessarily indicate the same embodiment, or an independent or alternative embodiment that is exclusive with other embodiments. Those skilled in the art explicitly and implicitly understand that the embodiments described in the present disclosure may be combined with other embodiments.

A preset scenario in the present disclosure refers to a speech recognition scenario in which speech data is converted into text data, for example, including a scenario of lecture, training, meeting, interview, teaching and the like. A terminal refers to an intelligent terminal of a user, including terminal devices such as a mobile phone, a tablet, a laptop, a recording pen, or an intelligent office laptop. The intelligent terminal has capabilities of networking and communicating, and may further have a capability of recording, which includes capabilities of photographing and text editing.

First Embodiment

Figure 1:
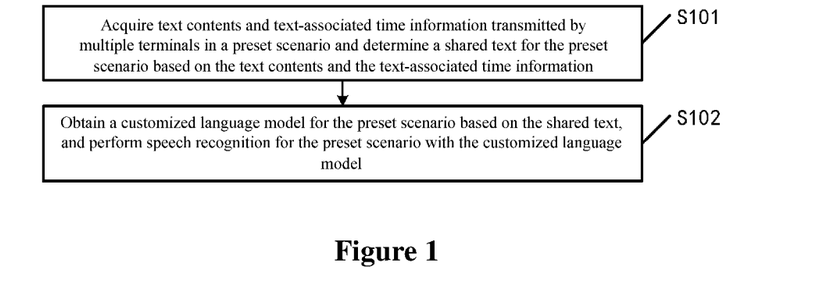
FIG. 1 is a schematic flowchart of a speech recognition method according to a first embodiment of the present disclosure.

Reference is made to FIG. 1, which shows a speech recognition method. The method is performed by an electronic device. The electronic device may be a general computer, a server or other device. Apparently, in practical applications, the electronic device may be a data processing center, a cloud platform and the like. Implementation of the electronic device is not limited in the present disclosure. As shown in FIG. 1, the method includes the following steps S101 and S102.

In step S101, text contents and text-associated time information transmitted by multiple terminals in a preset scenario are acquired, and a shared text for the preset scenario is determined based on the text contents and the text-associated time information.

Users of the multiple terminals are in the same preset scenario. For example, the multiple users may be attending a meeting. The text-associated time information indicates when the text content is generated. Implementation of step S101 may refer to the following second embodiment, which is not repeated herein.

In step S102, a language model customized for the preset scenario is obtained based on the shared text, and speech recognition for the preset scenario is performed with the customized language model.

Implementation of step S102 may refer to the following fourth embodiment, which is not repeated herein.

Figure 2:
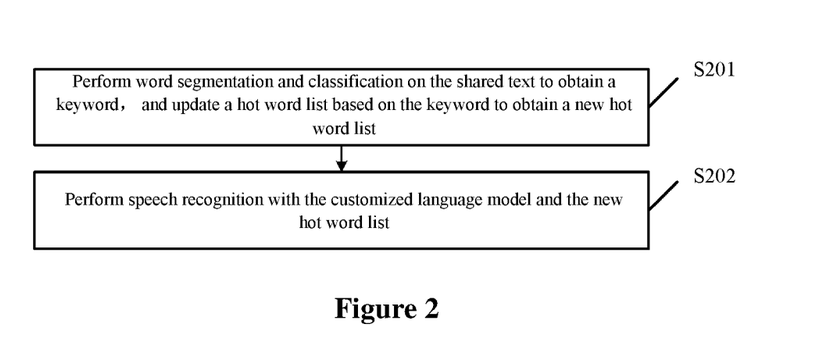
FIG. 2 is a schematic flowchart of step 102 according to the first embodiment of the present disclosure.

Further, reference is made to FIG. 2, which is a schematic flowchart of step 102 according to the first embodiment of the present disclosure. Step S102 includes the following steps S201 and S202.

In step S201, word segmentation and classification are performed on the shared text to obtain one or more keywords, and a hot word list is updated based on the one or more keywords to obtain a new hot word list.

In step S202, speech recognition is performed with the customized language model and the new hot word list.

Implementations of steps S201 and S202 may refer to the following third embodiment, which are not repeated herein.

In an embodiment, before the speech recognition for the preset scenario is performed with the customized language model, the method further includes performing word segmentation and classification on the shared text to obtain one or more keywords, and updating a hot word list for the preset scenario based on the one or more keywords to obtain a new hot word list.

In an embodiment, the speech recognition for the preset scenario is performed with the customized language model by performing the speech recognition for the preset scenario with the customized language model and the new hot word list.

With regard to how to obtain the one or more keywords, how to obtain the new hot word list, and how to perform the speech recognition for the preset scenario with the customized language model and the new hot word list, reference may be made to the following embodiments, which are not described herein.

In an embodiment, the new hot word list takes effect when the new hot word list is generated, so that hot words take effect in time, thereby improving accuracy of speech recognition.

In the embodiment of the present disclosure, text contents and text-associated time information transmitted by the multiple terminals in the preset scenario are acquired. The shared text for the preset scenario is determined based on the text contents and the text-associated time information. Customized language model and one or more keywords for the preset scenario are obtained based on the shared text. The hot word list for the preset scenario is updated based on the one or more keywords to obtain a new hot word list. Speech recognition for the preset scenario is performed with the customized language model and the new hot word list. Therefore, with the technical solution of the embodiment of the present disclosure, the terminals in the preset scenario acquire the text contents and the text-associated time information for the preset scenario to determine the shared text of the preset scenario, and thus the customized language model is obtained and the hot word list is updated based on the shared text. The new hot word list and the customized language model are highly correlated with the preset scenario, so that performing the speech recognition for the preset scenario with the customized language model and the new hot word list effectively improves the accuracy of the speech recognition.

Second Embodiment

The second embodiment is provided based on the first embodiment. The text content described above is generated by the user on the terminal and is related to the preset scenario, which includes a note made by the user based on the preset scenario, a mark made by the user on an electronic material related to the preset scenario, a picture including text information taken by the user using the intelligent terminal, and/or the like. The note may be handwritten or input manually and may include, for example, a note handwritten on a physical carrier such as paper and a handout, or a note recorded on an electronic carrier in a form of memo, word, PDF, PPT and the like. The electronic material related to the preset scenario includes a speech recognition result document received by the intelligent terminal or generated locally, an electronic material for the speech recognition scenario (for example, an electronic material for a lecture, a training, or a meeting in a form of PPT, PDF, or word), and/or the like. The mark on the electronic material related to the preset scenario includes modification, highlighting and/or the like that are marked by the user on the speech recognition result document or the electronic material.

Further, the text content and the text-associated time information may be determined on the terminal, as follows.

A. For a note manually input by the user with an input method, the text content is determined based on the note, and a time when the note is input is determined as a time when the text content is generated, namely, the text-associated time information.

B. For a note handwritten by the user on an intelligent terminal, the handwritten note is processed according to handwriting recognition principles to obtain the text content, and a time when the note is handwritten is determined as a time when the text content is generated, namely, the text-associated time information.

C. For a mark made by the user on an electronic material related to the preset scenario, the electronic material related to the preset scenario is processed according to optical character recognition principles to obtain the text content corresponding to the mark, and a time when the mark is made, namely, a making time, is determined as a time when the text content is generated, namely, the text-associated time information.

D. For a picture including text information taken by the user using an intelligent terminal, the picture is processed according to optical character recognition principles to recognize the text content in the picture, and a time when the picture is taken is determined as a time when the text content is generated, namely, the text-associated time information.

Figure 3:
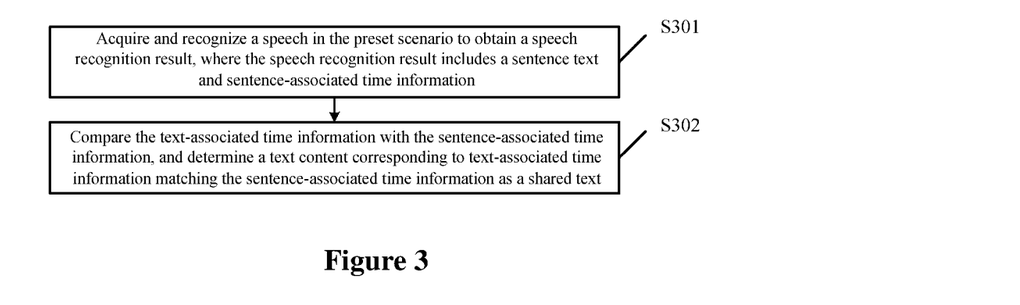
FIG. 3 is a schematic flowchart of step 101 according to a second embodiment of the present disclosure.

Reference is made to FIG. 3, which is a schematic flowchart of step 101 according to the second embodiment of the present disclosure. Step S101 includes the following steps S301 and S302.

In step S301, a speech in the preset scenario is acquired and recognized to obtain a speech recognition result. The speech recognition result includes a sentence text and sentence-associated time information.

A terminal in the preset scenario performs speech recognition with a real-time speech recognition application on the terminal to obtain a speech recognition result. The sentence text is a recognition text of a speech clause, and the sentence-associated time information is a time when the recognition of the speech clause ends, namely, a time boundary determined based on a time point when endpoint detection information is synchronously generated in speech recognition.

In step S302, the text-associated time information is compared with the sentence-associated time information. A text content corresponding to text-associated time information matching the sentence-associated time information is determined as a shared text.

For a text content transmitted by a terminal, in a case that text-associated time information of the text content indicates a time point between a speech recognition start time of a speech clause and a recognition end time of the speech clause, it is considered that the text-associated time information matches the sentence-associated time information and the text content corresponding to the text-associated time information is determined as the shared text. In this embodiment of the present disclosure, the speech recognition result generated by the terminal is determined as the shared text. For the shared text obtained after step S302, in addition to the text contents transmitted by other terminals, the speech recognition result obtained by the terminal is determined as the shared text in this embodiment, to obtain a more accurate shared text, thereby improving accuracy of the subsequently generated customized language model and improving accuracy of the speech recognition.

A process of obtaining the shared text is described below.

Multiple terminals in the preset scenario communicate with each other through an existing local area network and a channel for communications between the multiple terminals is established in the preset scenario. A user of any one of the multiple terminals transmits synchronization information for requesting text sharing to all terminals in the local area network through a real-time speech recognition application on the terminal. Users of terminals receiving the synchronization information determine whether to respond to the text sharing request to join text sharing. Multiple terminals join text sharing and form a group. In actual speech recognition scenarios, times on the terminals may be artificially disturbed by the users (for example, the users set different time zones or manually adjust time information), so it is needed to synchronize the terminals in a group to ensure temporal consistency of subsequently transmitted text content and speech recognition result. Any terminal in the group may be selected as a time server and time on the selected terminal serves as a reference time. Other terminals synchronize with the reference time according to a network time protocol (NTP), ensuring temporal consistency of subsequently transmitted text content and speech recognition result.

Figure 4:
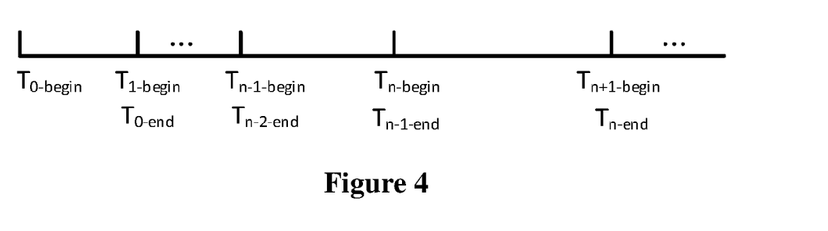
FIG. 4 is a schematic diagram showing time at which shared text is acquired according to the second embodiment of the present disclosure.

The synchronization of time information ensures consistency of time information of all terminals, so that when a real-time speech recognition result is generated (recognition result of each sentence includes time information), segmentation may be simultaneously performed in real time according to an conventional segmentation strategy, to determine a time period from a start time instant $T_{n\text{-}begin}$ of a current paragraph and an end time instant T-n-end of the current paragraph as a time period in which a shared text is built (that is, a time period of acquiring the shared text). FIG. 4 is a schematic diagram showing the time period of acquiring the shared text according to the second embodiment of the present disclosure. The start time instant $T_{n\text{-}begin}$ of the current paragraph is a start time instant $T_{0\text{-}begin}$ of text conversion or an end time instant $T_{n\text{-}1\text{-}begin}$ of a previous paragraph. The end time instant $T_{n\text{-}end}$ of the current paragraph is a time instant corresponding to an ending sentence of the real-time paragraph. The determined end time instant $T_{n\text{-}end}$ of the current paragraph is a time instant at which the customized language model determined based on the shared text takes effect. A strategy of determining the customized language model is described with reference to the fourth embodiment. At the end time instant $T_{n\text{-}end}$, the customized language model is updated based on the shared text obtained through filtering and cleaning, and thus a second recognition result of the paragraph is rescored with the updated customized language model and the updated customized language model assists in real-time decoding of a next paragraph.

Figure 5:
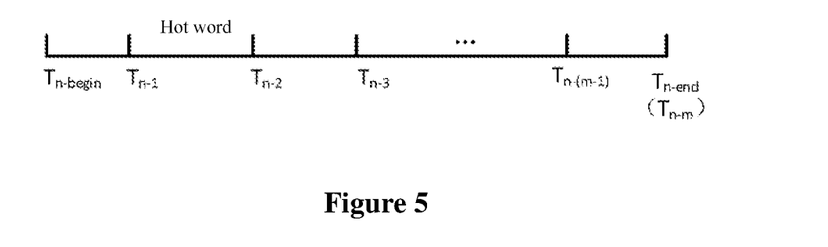
FIG. 5 is a schematic diagram showing a time period in which shared text is acquired according to the second embodiment of the present disclosure.

In addition, based on clause information determined according to endpoint detection information generated synchronously with the speech recognition result, the number of rounds for acquiring the text contents within the time period and the effective time of the hot words are determined. FIG. 5 is a schematic diagram showing the time period of acquiring the shared text according to the second embodiment of the present disclosure. A time instant $T_{n\text{-}begin}$ serves as a start of a time period in which a current shared text is acquired, and a time instant $T_{n\text{-}end}$ serves as an end of the time period in which the current shared text is acquired. For m speech clauses (time boundaries determined based on time points of endpoint detection generated synchronously with the speech recognition) in the speech paragraph, a shared text is subjected to a round of sharing after each clause (for example, $T_{n-1}, T_{n-2}, T_{n-3} \ldots T_{n-m}$). If the acquired text-associated time information of text content indicates a time point that is within the current clause and is not within a previous time period, the text content is acquired. If a new hot word (that is, a keyword, and determination of the keyword is set forth with reference to the third embodiment) is acquired based on the acquired shared text, for example, a new word is obtained at the time instant $T_{n-2}$, the hot word is added to the hot word list immediately. That is, the hot word takes effect at the time instant $T_{n-2}$.

Third Embodiment

Figure 6:
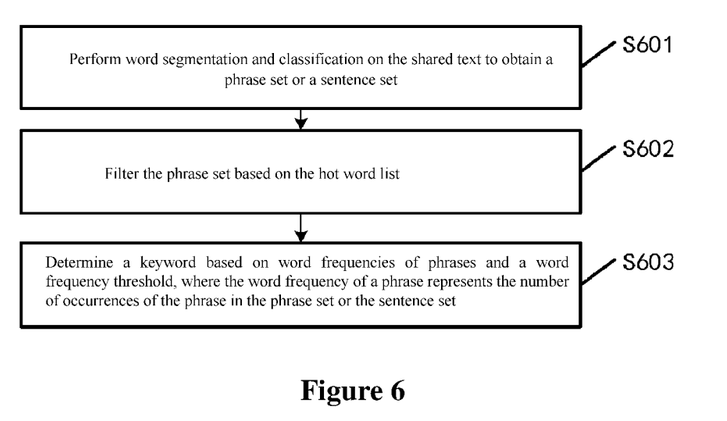
FIG. 6 is a schematic flowchart of step S201 according to a third embodiment of the present disclosure.

Reference is made to FIG. 6, which is a schematic flowchart of step S201 according to the third embodiment of the present disclosure. A method for obtaining one or more keywords based on a set of shared texts is described below. Step S201 includes the following steps S601 to S603.

In step S601, word segmentation and classification are performed on the shared text to obtain a phrase set or a sentence set.

Figure 7:
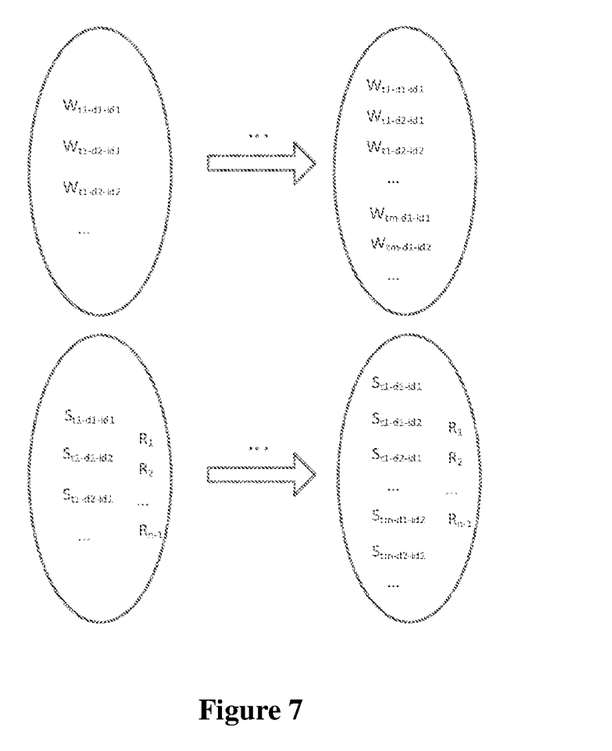
FIG. 7 is a schematic diagram showing shared text set according to the third embodiment of the present disclosure.

A set of shared texts within a current time period is built. The set of shared texts is built in the time period of acquiring the shared text determined according to the second embodiment. Word segmentation and classification are performed on text contents acquired at all time instants $\{T_{n-1}, T_{n-2}, \ldots, T_{n-m}\}$ within the current time period from the time instant $T_{n\text{-}begin}$ to the time instant $T_{n\text{-}end}$. The text contents are divided into two categories, which are words (phrases) and sentences (paragraphs). The words (phrases) form a phrase set and the sentences (paragraphs) form a sentence set. If the number of words of a text content after word segmentation is less than 2, the text content is considered to belong to the category of words (phrases), otherwise the text content is considered to belong to the category of sentences (paragraphs). For example, shared text sets including texts shared by different terminals acquired at the time instant $T_{n-1}$ and the time instant $T_{n-m}$ are as shown in FIG. 7. FIG. 7 is a schematic diagram showing the shared text sets according to the third embodiment of the present disclosure. $W_{t1\text{-}d1\text{-}id1}$ represents a word with a serial number id1 acquired by a device d1 at a time instant t1. $S_{t1\text{-}d1\text{-}id1}$ represents a sentence (paragraph) with a serial number id1 acquired by the device d1 at the time instant t1. $\{R_1, \ldots, R_{n-1}\}$ represents real-time speech recognition results of (n−1) paragraphs acquired within the current time period.

In step S602, the phrase set is filtered based on the hot word list.

The hot word list for the preset scenario may be formed by words that are manually input in advance. Phrases already in the hot word list are removed from the phrase set. For example, if a word with a serial number id1 is included in the hot word list, the word is removed from the word (phrase) set {Wta-db-idc}.

In step S603, a keyword is determined based on word frequencies of phrases and a word frequency threshold. The word frequency of a phrase represents the number of occurrences of the phrase in the phrase set or the sentence set.

Step S603 includes the following sub steps E1 to E3.

In sub step E1, the word frequency of each phrase in the phrase set is acquired.

For each phrase, the number of occurrences of the phrase in the phrase set or in the sentence set is calculated as the word frequency of the phrase.

In sub step E2, a phrase having a word frequency greater than or equal to the word frequency threshold and transmitted by different terminals is determined as a keyword.

The word frequency threshold may be changed according to actual situations. For example, the word frequency threshold may be set to be 2.

In sub step E3, another keyword is selected, using the TF-IDF algorithm, from phrases having word frequencies less than the word frequency threshold.

In this embodiment, a keyword is selected from the phrases having word frequencies less than the word frequency threshold using the TF-IDF algorithm. Unified word frequencies of phrases are calculated first. For each phrase, the number of occurrences of the phrase in the sentence set is calculated as the word frequency of the phrase, and a ratio of the word frequency to the number of total words in the sentence set is determined as the unified word frequency of the phrase. Next, an inverse document rate of the phrase is calculated by formula log(a total number of chapters in a preset corpus)/(a total number of chapters including the phrase+1)). The preset corpus may be a set of chapter corpus used in training the language model for the preset scenario. Then a product of the unified word frequency and the inverse document rate is determined as a correlation score of the phrase. The keyword is selected based on a score threshold and correlation scores of the phrases. The score threshold may be set according to actual needs. A phrase having a correlation score greater than or equal to the score threshold is determined as the keyword.

It should be noted that due to typos in different handwritings of different users for the same phrase or errors of optical character recognition, the keyword determined in step S603 and a phrase in the hot word list may form homonyms, or different keywords may form homonyms. Therefore, the homonym phrases are filtered based on language model scores. From the homonym phrases, a phrase having a higher language model score in the homonym phrases is determined as the keyword. Step S201 further includes the following sub steps F1 to F3.

In sub step F1, homonym phrases in the keywords or between the keywords and the words in the hot word list are determined.

Modeling dictionary mapping is performed on the keywords and the phrases in the hot word list to determine whether there are homonym phrases between the keywords and the phrases in the hot word list. For example, by mapping keywords into vowel modeling units or main vowel modeling units, homonyms in the keywords may be identified. In a case that no homonym phrase is found for a keyword after comparing the keyword with other keywords and with phases in the hot word list, the keyword is directly added to the hot word list.

In sub step F2, a sentence text including a phrase among the homonym phrases is determined and the phrase in the sentence text is replaced with a homonym phrase of the phrase among the homonym phrases to obtain a sentence text subjected to phrase replacement.

In sub step F3, based on language model scores of the sentence texts subjected to phrase replacement, a homonym phrase in a sentence text having a highest language model score is determined as a new word to be added to the hot word list.

First, a sentence including the keyword having a homonym phrase is identified in the sentence set, and the keyword is replaced with the homonym phrase(s) for the keyword to obtain multiple sentences. Then language model scores of the multiple sentences are calculated. A phrase included in a sentence having a highest language model score is determined as a word to be added to the hot word list. The language model scores may be calculated with the conventional language model. For example, for a keyword "Tomato richest man", having a homonym phrase of "The richest man in Xihong City" in Chinese, sentences including either "Tomato richest man" or "The richest man in Xihong City" are identified. For example, sentences "Tomato richest man is a comedy starring Shen Teng and Song Yunhua" and "The richest man in Xihong City is released in 2018" are found and keywords in the sentences are replaced to obtain two pairs of sentences. A pair of sentences includes "Tomato richest man is a comedy starring Shen Teng and Song Yunhua" and "The richest man in Xihong City is a comedy starring Shen Teng and Song Yunhua". The other pair of sentences includes "Tomato richest man is released in 2018" and "The richest man in Xihong City is released in 2018". For each pair of sentences, language model scores of two sentences are compared. If for each pair of sentences, the sentence including "The richest man in Xihong City" having a language model score higher than that of the sentence including "Tomato richest man", it is considered that "Tomato richest man" is a wrong keyword and "The richest man in Xihong City" is a right keyword, so that "The richest man in Xihong City" is determined as a word to be added to the hot word list.

Keywords are filtered by calculating language model scores of sentences including homonyms of the keywords. The keyword associated with a language model score higher than its homonym(s) is added to the hot word list. The keyword takes effect immediately when the keyword is added to the hot word list. The homonym phrases associated with lower language model score is removed from the hot word list. In a case of equal language model scores, both the keyword and homonym phrases thereof are determined as words to be added to the hot word list. In a case that the keyword corresponds to a lower language model score than its homonym phrases, the keyword is removed.

By filtering homonym phrases, an accurate keyword is determined, ensuring accuracy of speech recognition.

Fourth Embodiment

The fourth embodiment is provided according to the first embodiment and the second embodiment. In this embodiment, before the customized language model for the preset scenario is obtained based on the shared text and the speech recognition is performed for the preset scenario with the customized language model, the method further includes: segmenting the speech recognition result to obtain a segmentation time point of the paragraph. After the segmentation time point, the customized language model for the preset scenario is obtained based on the shared text and the speech recognition is performed for the preset scenario with the customized language model.

After recognition of the current speech paragraph is finished, the customized language model for the preset scenario is obtained based on a shared text corresponding to the current speech paragraph. Speech recognition is performed on a next speech paragraph with the customized language model and the current speech paragraph is re-decoded, thereby improving accuracy of speech recognition.

In addition, the customized language model used in speech recognition is generated only after the segmentation time point, avoiding frequent updating of the language model, thereby reducing computation burden.

Further, after the segmentation time point, the customized language model for the preset scenario is obtained based on the shared text by performing the following sub steps G1 and G2.

In sub step G1, text similarity between the text contents and the speech recognition result is determined.

The shared text corresponding to the current speech paragraph is from multiple terminals. Text similarity between text content and the speech recognition result transmitted by a terminal is calculated.

In step G2, a text content corresponding to a text similarity less than a similarity threshold is filtered out.

A text content corresponding to text similarity less than the similarity threshold is deleted and a text content corresponding to text similarity greater than or equal to the similarity threshold is reserved. In this way, text contents in the shared text are filtered.

Figure 8:
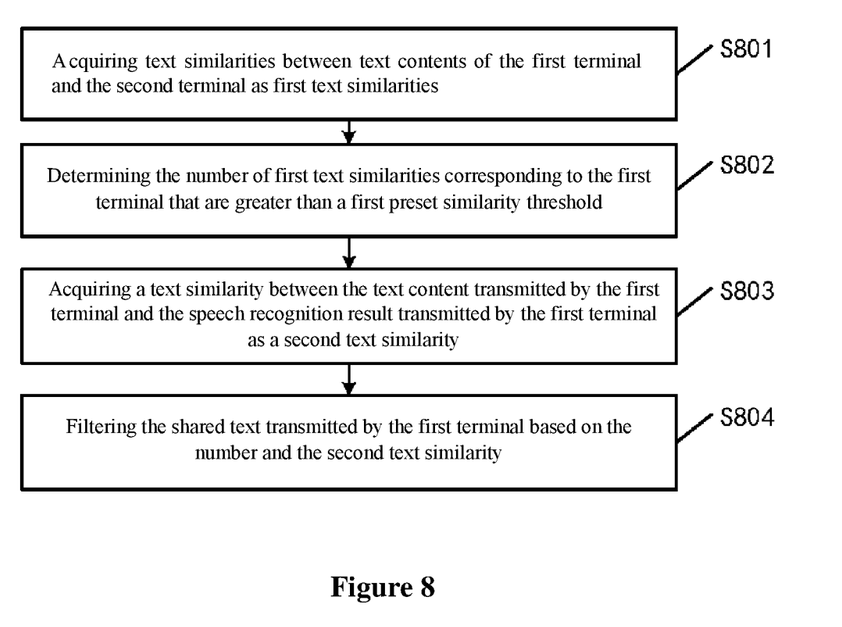
FIG. 8 is a schematic flowchart for filtering text content according to a fourth embodiment of the present disclosure.

Specially, the text contents may be filtered based on text similarity between text contents from different terminals. Reference is made to FIG. 8, which is a schematic flowchart for filtering text contents according to the fourth embodiment of the present disclosure. Filtering the text contents is described below by taking a first terminal and a second terminal (other terminal than the first terminal among the different terminals) as an example.

In step S801, text similarities between text contents from the first terminal and the second terminal is acquired as a first text similarities.

For example, for the text contents transmitted by the first terminal (Y1) and the second terminal (assuming that there are two second terminals represented by Y2 and Y3 respectively), text similarity X1 between the text content transmitted by Y1 and the text content transmitted by Y2 and text similarity X2 between the text content transmitted by Y1 and the text content transmitted by Y3 are calculated. That is, the first text similarities corresponding to Y1 include X1 and X2.

In step S802, the number of first text similarities corresponding to the first terminal greater than a first preset similarity threshold is acquired.

The number of first text similarities corresponding to the first terminal greater than the first preset similarity threshold is determined based on the first preset similarity threshold. The first preset similarity threshold is set according to actual situations. Taking Y1 as an example, assuming that X1 and X2 are greater than the first preset similarity threshold, the number of first text similarities corresponding to Y1 greater than the first preset similarity threshold is equal to 2.

In step S803, text similarity between the text content transmitted by the first terminal and the speech recognition result transmitted by the first terminal is acquired as second text similarity.

Taking Y1 as an example, text similarity between the text content from Y1 and the speech recognition result from Y1 is calculated and the text similarity serves as the second text similarity.

In step S804, the shared text transmitted by the first terminal is filtered based on the number and the second text similarity.

In a case that the number corresponding to the first terminal is less than a preset value and the second text similarity is less than a second preset similarity threshold, the text content from the first terminal is determined as invalid information and the text content is deleted. In a case that the number is greater than or equal to the preset threshold or in a case that the second text similarity is greater than or equal to the second preset similarity threshold, the text content transmitted by the first terminal is determined as relevant information and the text content is reserved. It is easy to understand that in a case that the number is greater than or equal to the preset value and the second text similarity is greater than or equal to the second preset similarity threshold, the text content transmitted by the first terminal is determined as the relevant information and is reserved.

Further, the speech recognition for the preset scenario is performed with the customized language model as follows. The customized language model is determined based on the shared text in the paragraphs set. A first decoding network is generated based on the customized language model, a preset acoustic model, and a preset dictionary model; a second decoding network is generated based on a preset language model, the preset acoustic model, and the preset dictionary model; and then a decoding network is generated using a conventional serial decoding scheme. In other words, by introducing two special nodes "start" and "end", the first decoding network and the second decoding network are connected; and the first decoding network and the second decoding network compete with each other at any position, so that the first decoding network is integrated into the second decoding network at a small cost, realizing common decoding and obtaining high speech recognition accuracy. The first decoding network and the second decoding network may be decoding networks such as WFST. In this embodiment, after speech recognition performed on the current speech paragraph is finished, a current paragraph set is obtained. A decoding network is obtained based on the current paragraph set and speech recognition for a next speech paragraph is performed on with the obtained decoding network. Due to high correlation between the decoding network and the preset scenario, the accuracy of speech recognition can be effectively improved.

Further, the customized language model for the preset scenario is obtained based on the shared text in the paragraph set by performing the following sub steps H1 and H2.

In sub step H1, an initial language model is obtained based on the shared text in the paragraph set.

Based on the shared text in the paragraph set, the initial language model is generated with the conventional method for generating language model. The initial language model is more relevant to the preset scenario. Taking an N-gram language model as an example, the N-gram language model is trained based on the shared text in the paragraph set to obtain the initial language model.

In sub step H2, probability interpolation is performed on the initial language model and the preset language model to obtain the customized language model.

In order to make a path score of the first decoding network comparable to a path score of the second decoding network, the N-gram probability of the initial language model is interpolated with the N-gram probability of the preset language model. In addition, in order to ensure a scale of the N-gram of the initial language model, probability interpolation is performed only on the N-gram in the initial language model. Take an third-order language model as an example:

Pnew(wx|wx-2wx-1)=αPn(wx|wx-2wx-1)+αβPn-1 (wx|wx-2wx-1)+αβ2Pn-2(wx|wx-2wx-1)+ . . . +αβn-1P1(wx|wx-2wx-1)+(1-α-αβ-αβ2- . . . αβn-1)Pb(wx|wx-2wx-1) (where wx|wx-2wx-1 belongs to the shared text).

In the above equation, Pb represents the N-gram probability of the preset language model, Pi (i=1 . . . n) represents the N-gram probability of the initial language model generated based on an i-th paragraph set, Pnew represents the N-gram probability of the initial language model subjected to interpolation process (i.e. the customized language model), a represents an interpolation coefficient and β represents a penalty coefficient. In this way of interpolation, the scale of the N-gram does not change, and the amount of calculation is small.

Further, speech recognition for the preset scenario is performed with the customized language model as following.

Reference is made to FIG. 4, taking the speech paragraph from the time instant $T_{0\text{-}begin}$ to the time instant $T_{0\text{-}end}$ as an example. After the customized language model is obtained based on the shared text corresponding to the time instant $T_{0\text{-}begin}$ to the time instant $T_{0\text{-}end}$, a candidate speech recognition result of the speech from the time instant $T_{0\text{-}begin}$ to the time instant $T_{0\text{-}end}$ is rescored with the customized language model. That is, a language model score of the candidate speech recognition result of the speech from the time instant $T_{0\text{-}begin}$ to the time instant $T_{0\text{-}end}$ is calculated with the customized language model. Based on the language model score and the original acoustic model score of the candidate speech recognition result, a candidate speech recognition result with higher scores is determined as an accurate recognition result. The original speech recognition result of the speech from the time instant $T_{0\text{-}begin}$ to the time instant $T_{0\text{-}end}$ is modified based on the candidate speech recognition result, to obtain a final speech recognition result of the speech from the time instant $T_{0\text{-}begin}$ to the time instant $T_{0\text{-}end}$. By rescoring, accuracy of recognition of the speech from the time instant $T_{0\text{-}begin}$ to the time instant $T_{0\text{-}end}$ can be improved.

It should be noted that with the combination of the third embodiment and the fourth embodiment, the accuracy of speech recognition can be significantly and timely improved through the combination of immediately effective keywords, rescoring and the decoding network.

Fifth Embodiment

Figure 9:
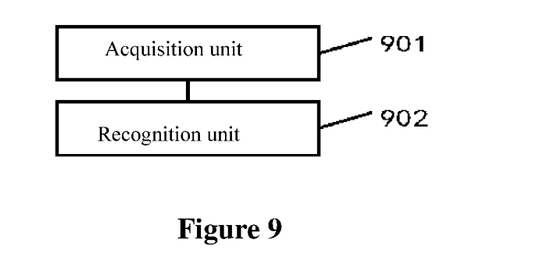
FIG. 9 is a structural schematic diagram of a speech recognition apparatus according to a fifth embodiment of the present disclosure.

A device is provided according to the fifth embodiment of the present disclosure. Referring to FIG. 9, which shows a speech recognition apparatus, the speech recognition apparatus includes an acquisition unit 901 and a recognition unit 902.

The acquisition unit 901 is configured to acquire text contents and text-associated time information transmitted by multiple terminals in a preset scenario and determine a shared text for the preset scenario based on the text contents and the text-associated time information.

Implementation of the acquisition unit 901 may refer to the second embodiment, which is not repeated herein.

The recognition unit 902 is configured to obtain a customized language model for the preset scenario based on the shared text, and perform speech recognition for the preset scenario with the customized language model.

Further, the recognition unit 902 includes a keyword acquisition module and a recognition module.

The keyword acquisition module is configured to perform word segmentation and classification on the shared text to obtain a keyword, and update a hot word list based on the keyword to obtain a new hot word list.

The recognition module is configured to perform speech recognition with the customized language model and the new hot word list.

Implementation of the recognition unit 902 may refer to the third embodiment and the fourth embodiment, which is not repeated herein.

In this embodiment of the present disclosure, the text contents and the text-associated time information transmitted by the multiple terminals in the preset scenario are acquired. The shared text for the preset scenario is determined based on the text contents and the text-associated time information. The customized language model and the keyword for the preset scenario are obtained based on the shared text. The hot word list for the preset scenario is updated based on the keyword to obtain the new hot word list. Speech recognition for the preset scenario is performed with the customized language model and the new hot word list. Therefore, with the technical solution of the embodiment of the present disclosure, the terminals in the preset scenario acquire the text contents and the text-associated time information for the preset scenario to determine the shared text of the preset scenario, and thus the customized language model is obtained and the hot word list is updated based on the shared text. The new hot word list and the customized language model are highly correlated with the preset scenario, so that performing the speech recognition for the preset scenario with the customized language model and the new hot word list effectively improves the accuracy of the speech recognition.

In an embodiment, the acquisition unit 901 includes a result acquisition module and a matching module.

The result acquisition module is configured to acquire and recognize a speech in the preset scenario to obtain a speech recognition result. The speech recognition result includes a sentence text and sentence-associated time information.

The matching module is configured to compare the text-associated time information with the sentence-associated time information, and determine a text content corresponding to text-associated time information matching the sentence-associated time information as a shared text.

In an embodiment, the keyword acquisition module includes a first sub module, a second sub module, and a third sub module.

The first sub module is configured to perform word segmentation and classification on the shared text to obtain a phrase set or a sentence set.

The second sub module is configured to filter the phrase set based on the hot word list.

The third sub module is configured to determine a keyword based on word frequencies of phrases and a word frequency threshold. The word frequency of a phrase represents the number of occurrences of the phrase in the phrase set or the sentence set.

In an embodiment, the keyword acquisition module further includes a fourth sub module, a fifth sub module, and a sixth sub module.

The fourth sub module is configured to determine homonym phrases between keywords or between keywords and the words in the hot word list.

The fifth sub module is configured to determine a sentence text including a phrase among the homonym phrases and replace the phrase in the sentence text with a homonym of the phrase among the homonym phrases to obtain a sentence text subjected to phrase replacement.

The sixth sub module is configured to determine, based on language model scores of the sentence texts subjected to phrase replacement, a homonym phrase in a sentence text having a highest language model score as a new word to be added to the hot word list.

In an embodiment, the speech recognition further includes a segmentation unit and a recognition unit.

The segmentation unit is configured to segment the speech recognition result to obtain a segmentation time point of a paragraph.

The recognition unit is configured to obtain, after the segmentation time point, the customized language model for the preset scenario based on the shared text and perform speech recognition for the preset scenario with the customized language model.

In an embodiment, the recognition unit includes a similarity determination module and a filtering module.

The similarity determination module is configured to determine text similarity between the text content and the speech recognition result.

The filtering module is configured to filter out, based on the text similarity and a similarity threshold, a shared text corresponding to a text similarity less than the similarity threshold.

With the device described above, the accuracy of speech recognition can be improved. Implementation of functions of the speech recognition apparatus may refer to the above method embodiments, which is not repeated herein.

In the embodiments of the present disclosure, the electronic device may be divided into functional units based on the above method examples. For example, the functional units are divided according to functions, or two or more functions may be integrated into a processing unit. The integrated unit may be implemented in a form of hardware or a software functional unit. It should be noted that the division of units in the embodiments of the present disclosure is schematic, which is only a logical function division, and the division may be in other forms in actual implementation.

A computer storage medium is further provided according to the embodiments of the present disclosure. The computer storage medium stores a computer program for exchange of electronic data. The computer program causes the computer to perform some or all of the steps of any method described in the above method embodiments, and the computer includes an electronic device.

A computer program product is further provided according to the embodiments of the present disclosure. The computer program product includes a non-transient computer-readable storage medium that stores a computer program. The computer program is executable to cause the computer to perform some or all of the steps of any method described in the above method embodiments. The computer program product may be a software installation package, and the computer includes an electronic device.

It should be noted that the above method embodiments are all expressed as a series of actions for brief description. However, those skilled in the art should be aware that the present disclosure is not limited by the order of the actions. According to the present disclosure, some steps may be performed in other order or performed simultaneously. In addition, those skilled in the art should be aware that the embodiments described in the present disclosure are preferred embodiments, and the actions and modules in the embodiments are not necessitated for the present disclosure.

In the above embodiments, each embodiment emphasizes the differences from others. Content of an embodiment that is not described in detail may be referred to the relevant descriptions of other embodiments.

In the embodiments of the present disclosure, it should be understood that the disclosed apparatus may be implemented in other forms. For example, the apparatus embodiments described above are only schematic. For example, the division of the units is only based on logical functions, and the division may be implemented in other forms in actual implementation. For example, multiple units or components may be combined or integrated into another system, or some features may be omitted or not executed. In addition, the coupling, direct coupling or communication connection shown or described above may be an indirect coupling or communication connection through some interfaces, apparatuses or units, which may be electrical or in other forms.

Units described as separate components may be or may not be physically separated. Components shown as units may be or may not be physical units, that is, may be located in one location or may be distributed in multiple network units. Some or all of the units may be selected as needed, to implement the technical solutions of the embodiments.

In addition, functional units in embodiments of the present disclosure may be integrated in one processing unit, or may be physically independent. Alternatively, two or more units may be integrated in one processing unit. The integrated unit may be implemented in a form of hardware, or in a form of a software function unit.

In a case that the integrated unit is implemented in the form of a software functional unit and sold or used as an independent product, the integrated unit may be stored in a computer-readable memory. Based on this understanding, the essence of the technical solution of the present disclosure, i.e., essential part of the technical solution that makes contribution to the conventional technology or all of or a part of the technical solution may be embodied in a form of a software product. The computer software product is stored in a memory which includes several instructions used to cause a computer device (which may be a personal computer, a server, a network device or the like) to implement all or some of steps of the methods described in the embodiments according to the present disclosure. The memory described above includes various media capable of storing program codes, such as a USB flash disk, a read-only memory (ROM), a random access memory (RAM), a mobile disk, a disk or an optical disk.

Those skilled in the art can understand that all or some of the steps in the various methods according to the embodiments may be performed by instructing relevant hardware through a program. The program may be stored in a computer-readable memory, and the memory can include a flash disk, a read only memory (ROM), a random access memory (RAM), a disk, an optical disk and the like.

The embodiments of the present disclosure are described in detail above. The principle and the embodiments of the present disclosure are described in connection with examples. The embodiments are described to facilitate understanding of the method and the core idea of the present disclosure. In addition, those skilled in the art may make variation to the embodiments and the application range based on the idea of the present disclosure. In summary, this description should not be understood as limitation to the present disclosure.

What is claimed is:

1. A speech recognition method comprising:
  acquiring text contents and text-associated time information transmitted by a plurality of terminals in a preset scenario and determining a shared text for the preset scenario based on the text contents and the text-associated time information; and
  obtaining a customized language model for the preset scenario based on the shared text, and performing speech recognition for the preset scenario with the customized language model, comprising:
  performing word segmentation and classification on the shared text to obtain one or more keywords, and updating a hot word list based on the one or more keywords to obtain a new hot word list; and
  performing speech recognition with the customized language model and the new hot word list.

2. The method according to claim 1, wherein before performing speech recognition for the preset scenario with the customized language model, the method further comprises:
  performing word segmentation and classification on the shared text to obtain one or more keywords, and updating a hot word list for the preset scenario based on the one or more keywords to obtain a new hot word list.

3. The method according to claim 2, wherein performing speech recognition for the preset scenario with the customized language model comprises:
  performing speech recognition for the preset scenario with the customized language model and the new hot word list.

4. The method according to claim 1, wherein the new hot word list takes effect when the new hot word list is generated.

5. The method according to claim 1, wherein determining the shared text for the preset scenario based on the text contents and the text-associated time information comprises:
  acquiring and recognizing a speech in the preset scenario to obtain a speech recognition result, wherein the speech recognition result comprises a sentence text and sentence-associated time information; and
  comparing the text-associated time information with the sentence-associated time information, and determine a text content corresponding to text-associated time information matching the sentence-associated time information as the shared text.

6. The method according to claim 5, further comprising:
  determining the speech recognition result as the shared text.

7. The method according to claim 1, wherein performing word segmentation and classification on the shared text to obtain the one or more keywords, and updating the hot word list for the preset scenario based on the one or more keywords to obtain the new hot word list comprises:
  performing word segmentation and classification on the shared text to obtain a phrase set or a sentence set; and determining the one or more keywords based on word frequencies of phrases and a word frequency threshold, wherein the word frequency of a phrase represents the number of occurrences of the phrase in the phrase set or the sentence set.

8. The method according to claim 7, wherein determining the one or more keywords based on the word frequencies of the phrases and the word frequency threshold comprises:
acquiring the word frequency of each phrase in the phrase set;
determining a phrase having a word frequency greater than or equal to the word frequency threshold and transmitted by different terminals as one of the one or more keywords; and
selecting another one of the one or more keywords from phrases having word frequencies less than the word frequency threshold with a TF-IDF algorithm.

9. The method according to claim 7, wherein before determining the one or more keywords based on the word frequencies of the phrases and the word frequency threshold, the method further comprises:
filtering the phrase set based on the hot word list.

10. The method according to claim 1, wherein performing word segmentation and classification on the shared text to obtain the one or more keywords, and updating the hot word list based on the one or more keywords to obtain the new hot word list further comprises:
determining homonym phrases in the one or more keywords or between the one or more keywords and the words in the hot word list;
determining a sentence text including a phrase among the homonym phrases and replacing the phrase in the sentence text with a homonym of the phrase among the homonym phrases to obtain a sentence text subjected to phrase replacement; and
determining, based on language model scores of sentence texts subjected to phrase replacement, a homonym phrase in a sentence text having a highest language model score as a new word to be added to the hot word list.

11. The method according to claim 5, wherein before obtaining the customized language model for the preset scenario based on the shared text and performing speech recognition for the preset scenario with the customized language model, the method further comprises:
segmenting the speech recognition result to obtain a segmentation time point of a paragraph; and
obtaining, after the segmentation time point, the customized language model for the preset scenario based on the shared text, and performing speech recognition for the preset scenario with the customized language model.

12. The method according to claim 11, wherein obtaining, after the segmentation time point, the customized language model for the preset scenario based on the shared text comprises:
determining text similarities between the text contents and the speech recognition result; and
filtering out, based on the text similarities and a text similarity threshold, a text content corresponding to text similarity less than the similarity threshold.

13. The method according to claim 11, wherein
the plurality of terminals comprise a first terminal and a second terminal; and
after the segmentation time point, the method further comprises:
acquiring text similarities between text contents of the first terminal and the second terminal as first text similarities;
determining the number of first text similarities corresponding to the first terminal that are greater than a first preset similarity threshold;
acquiring a text similarity between the text content transmitted by the first terminal and the speech recognition result transmitted by the first terminal as a second text similarity; and
filtering the shared text transmitted by the first terminal based on the number and the second text similarity.

14. The method according to claim 1, wherein obtaining the customized language model for the preset scenario based on the shared text comprises:
acquiring an initial language model based on a shared text in a paragraph set, wherein the paragraph set is obtained after recognition of a current speech paragraph is finished; and
wherein probability interpolation is performed on the initial language model and a preset language model to obtain the customized language model.

15. The method according to claim 1, wherein
the text content is generated by a user on the terminal and is related to the preset scenario; and
the text content comprises at least one of: a note made by the user based on the preset scenario, a mark made by the user on an electronic material related to the preset scenario, or a picture including text information taken by the user using an intelligent terminal.

16. A speech recognition apparatus comprising a processor configured to:
acquire text contents and text-associated time information transmitted by a plurality of terminals in a preset scenario and determine a shared text for the preset scenario based on the text contents and the text-associated time information; and
obtain a customized language model for the preset scenario based on the shared text, and perform speech recognition for the preset scenario with the customized language model, comprising:
performing word segmentation and classification on the shared text to obtain one or more keywords, and updating a hot word list based on the one or more keywords to obtain a new hot word list; and
performing speech recognition with the customized language model and the new hot word list.

17. A non-transient computer storage medium storing a computer program, wherein the computer program comprises program instructions that, when executed by a processor:
acquire text contents and text-associated time information transmitted by a plurality of terminals in a preset scenario and determine a shared text for the preset scenario based on the text contents and the text-associated time information; and
obtain a customized language model for the preset scenario based on the shared text, and perform speech recognition for the preset scenario with the customized language model, comprising:
performing word segmentation and classification on the shared text to obtain one or more keywords, and updating a hot word list based on the one or more keywords to obtain a new hot word list; and performing speech recognition with the customized language model and the new hot word list.

18. The method according to claim 1, wherein the keyword is a phrase having a word frequency greater than or equal to a word frequency threshold and transmitted by 5 different terminals.

\* \* \* \* \*